United States Patent [19]

Fog

[11] Patent Number: 5,416,541
[45] Date of Patent: May 16, 1995

[54] FOLDING PORTABLE OVERHEAD PROJECTOR

[76] Inventor: Stephen C. Fog, 30 Siwanoy La., New Canaan, Conn. 06840

[21] Appl. No.: 243,199

[22] Filed: May 16, 1994

[51] Int. Cl.[6] .................................................. G03B 21/30
[52] U.S. Cl. .............................. 353/119; 353/DIG. 3
[58] Field of Search .................. 353/119, DIG. 3, 63, 353/64, 98

[56] References Cited

U.S. PATENT DOCUMENTS

| | | | |
|---|---|---|---|
| D. 322,264 | 12/1991 | Jewison | D16/232 |
| 2,552,184 | 5/1951 | Koch . | |
| 3,167,998 | 2/1965 | Appeldorn et al. | 353/DIG. 3 |
| 3,186,298 | 6/1965 | Schlesinger et al. . | |
| 3,560,088 | 2/1971 | Schwartz | 353/78 |
| 3,893,759 | 7/1975 | Crew | 353/79 |
| 3,979,160 | 9/1976 | Anderson et al. | 353/63 |
| 4,154,007 | 5/1979 | Judd | 35/39 |
| 4,213,679 | 7/1980 | Sakamoto et al. | 353/72 |
| 4,338,006 | 7/1982 | Ozeki | 353/85 |
| 4,403,216 | 9/1983 | Yokoi | 340/705 |
| 4,423,927 | 1/1984 | Bly | 350/331 |
| 4,436,393 | 3/1984 | Vanderwerf | 353/38 |
| 4,449,800 | 5/1984 | De Longis et al. | 353/119 |
| 4,588,271 | 5/1986 | Emura | 353/66 |
| 4,652,101 | 3/1987 | Grunwald | 353/122 |
| 4,696,557 | 9/1987 | Tomizuka | 353/66 |
| 4,756,604 | 7/1988 | Nakatsuka et al. | 350/331 |
| 4,795,252 | 1/1989 | Kyhl | 353/122 |
| 4,880,303 | 11/1989 | Grunwald | 353/122 |
| 4,882,599 | 11/1989 | Grunwald | 353/60 |
| 4,891,517 | 1/1990 | Ushiro et al. | 250/318 |
| 4,953,971 | 9/1990 | Highfill | 353/122 |
| 4,963,001 | 10/1990 | Miyajima | 350/331 |
| 4,968,134 | 11/1990 | Shimizu et al. | 353/119 |
| 4,969,733 | 11/1990 | Jewison | 353/119 |
| 4,978,218 | 12/1990 | Carpenter et al. | 353/119 |

FOREIGN PATENT DOCUMENTS

| | | |
|---|---|---|
| 2714166 | 10/1978 | Germany . |
| 3519506 | 12/1986 | Germany ........................ 353/119 |
| 3622472 | 1/1988 | Germany . |
| 60-97333 | 5/1985 | Japan . |

OTHER PUBLICATIONS

Presentation Products Magazine, May 1993, pp. 46–50, discloses "Overhead Projectors: A Fine Vintage Technology that Gets Better with Age".
Dukane Corporation catalog circa 1993 discloses a number of portable overhead prjectors and accessories.
An advertisement of Elmo Mfg. Corp., Sep. 1993, discloses fifteen models of overhead projectors.

Primary Examiner—William A. Cuchlinski, Jr.
Assistant Examiner—William C. Dowling
Attorney, Agent, or Firm—David P. Gordon

[57] ABSTRACT

A folding, portable overhead projector includes a thin stage body housing a fresnel lens on its top surface. The stage body is thicker on one side to form a lamp enclosure. A hinged mirror is provided within the stage body below the fresnel lens and a hinged lamp socket is provided within the lamp enclosure. Two pairs of folding legs are hingedly coupled to the stage body and the lamp enclosure and fold out from under the projector to lower the mirror and lamp and form a collapsible base for the projector. When unfolded, the legs tilt the lamp and the mirror so that light from the lamp is reflected by the mirror up through the fresnel lens on the stage. A collapsible bellows, a light baffle, and the mirror provide a substantially light and airtight enclosure for the lamp and mirror. Additional pairs of folding legs provide balance for the projector. At least one pair of legs are biased by a torsion spring and all of the legs are coupled to each other so that opening and closing is performed in a single action. An articulating foldable arm carrying a projection lens and mirror is attached to the lamp enclosure and is positionable over the stage. A high efficiency cooling fan cools both the lamp add the stage. Interlock and temperature safety switches are provided as well as unswitched accessory outlets. The projector is extremely light weight and collapses to a thin package which can fit into a brief case.

25 Claims, 8 Drawing Sheets

FOLDING PORTABLE OVERHEAD PROJECTOR

BACKGROUND OF THE INVENTION

1. Field of the Invention

This invention relates to overhead projectors. More particularly, the present invention relates to a portable overhead projector having hinged parts which allow it to collapse into a small, lightweight package.

2. State of the Art

Overhead projectors are old in the art but continue to enjoy widespread use in the fields of education and marketing. These projectors generally include a light source, one or more lenses and reflectors, and a stage upon which a transparency is placed for projection. Traditionally, transparencies used with overhead projectors were clear acetate sheets or a similar material and were written on with a grease pencil. More recently, letter size plastic sheets have been provided for imprinting with an electrostatic printer such as a photocopier or a laser printer. Even more recently, video LCD panels have been provided for use with an overhead projector. These LCD panels can be coupled to a video source or a portable computer so that a slide or video presentation can be projected onto a large surface. The use of LCD panels with overhead projectors has become quite widespread in recent years. See, e.g., p. 46, *Presentation Products Magazine*, May 1993. With an LCD panel and a portable computer, a presenter can carry a multimedia presentation kit in a briefcase. The only requirement for the presentation is the overhead projector. Unfortunately, most overhead projectors are too big and/or too heavy for convenient transportation by the presenter to a presentation location.

There are three general types of overhead projectors: transmissive, reflective, and opaque. Transmissive projectors have the light source below the stage and an overhead arm carrying a projection lens and a mirror. Light is focused and transmitted through the transparency on the stage toward the projection lens which is located by the arm over the stage and reflected by the mirror. The image of the transparency is thereby projected onto a large surface, typically a screen or a wall. Reflective projectors carry the light source in the overhead arm and have a reflective surface below the stage. Light shines down onto the stage and is reflected back up through the material which is placed on the stage. Opaque projectors are similar to reflective projectors but have the ability to project images of opaque materials and three dimensional objects in addition to transparencies. Of the three types of projectors, the transmissive type is generally the largest and the heaviest. While the reflective type projectors can weigh as little as ten pounds and can collapse to fit into a briefcase, these projectors will not work with an LCD panel.

In order to project the image created by an LCD panel, a relatively bright transmissive projector is required since LCD panels can absorb as much as 97% of the light passing through them. However, the projector must remain relatively cool so that the LCD panel is not damaged. Presently, there are no overhead projectors which are suitable for use with an LCD panel and which are small enough and light enough to be carried by a presenter to a presentation location in a briefcase.

SUMMARY OF THE INVENTION

It is therefore an object of the invention to provide a transmissive type overhead projector which is bright enough to project an image created by an LCD panel.

It is another object of the invention to provide a transmissive type overhead projector which is light enough to be carried by a presenter to a presentation location.

It is still another object of the invention to provide a transmissive type overhead projector which is small enough to fit into a briefcase.

In accord with these objects which will be discussed in detail below, the folding, portable overhead projector of the present invention includes a relatively thin stage body housing a fresnel lens on its top surface or beneath a polycarbonate plastic sheet on its top surface. The stage body is deeper on one side to form a lamp enclosure which is preferably integral with the stage body. A pivoting mirror is provided within the stage body below the fresnel lens and a pivoting lamp socket is provided within the lamp enclosure. Three folding support members are hingedly coupled to the stage body and fold out from where they are stored under the stage body. A first folding support member is hinged at the lamp enclosure and when this member is folded out from the stage body, the pivoting lamp socket tilts downward at an angle away from the lamp enclosure. A second folding support member is hinged at an opposite end of the stage body and when this member folds downward away from the stage body, the pivoting mirror tilts downward at an angle away from the fresnel lens. The angle of the mirror and the angle of the lamp socket are such that the lamp in the lamp socket directs light down onto the mirror and the mirror reflects the light up through the fresnel lens. A flexible bellows is coupled to the second support member to provide an enclosure for the lamp and mirror which prevents dispersion of light. A third folding support member is hinged at the stage body opposite the second support member and centrally hinged to the second support member in a scissor-like manner. The third support member provides balance for the stage body when the support members are extended. An articulating foldable arm carrying a projection lens and mirror is attached to the lamp enclosure and is positionable over the stage. In one embodiment of the invention, focusing is accomplished through regulating the height of the projection lens relative to the stage. In another embodiment, the projection lens has an array of lens elements and the focal plane of projection lens is adjustable by rotation of a focusing ring which displaces lens elements.

According to the preferred embodiment of the invention the first support member is a tray whose edges form a pair of legs which are slotted and the second support member is a tray whose edges form a pair of legs which are coupled to the slots in the first pair of legs. The hinged coupling of the third support member is via slots in the stage body. This arrangement of the legs allows all of the support members to fold out from below the stage body like a folding camera. The second, balancing support member is preferably a pair of legs coupled to the stage body with a torsion spring arrangement so that all of the legs are biased in both an opened and closed position. A fourth pair of legs may be hingedly coupled to the first pair of legs to provide additional balancing support for the projector.

Preferred aspects of the invention include: providing a high efficiency cooling fan between the legs of the first pair of legs; providing electrical outlets on a side of the stage body; and providing safety switches activated by temperature and by the folding legs so that power is removed from the lamp when the legs are folded into the stage body and when the temperature in the lamp enclosure rises above a safe level. It is also preferred that two lamp sockets and lamps be provided side-by-side and slidable between the first pair of legs and that the lamp sockets be wired to a selector switch. With this arrangement, a lamp failure during a presentation can be cured by flipping the selector switch and sliding the lamp sockets to move the selected lamp into the operational position.

Additional objects and advantages of the invention will become apparent to those skilled in the art upon reference to the detailed description taken in conjunction with the provided figures.

BRIEF DESCRIPTION OF THE DRAWINGS

FIG. 2a is a perspective view of a preferred embodiment of the first support member;

FIG. 2b is a side elevation view of the support member of FIG. 2a;

DETAILED DESCRIPTION OF THE PREFERRED EMBODIMENTS

Figure 1:
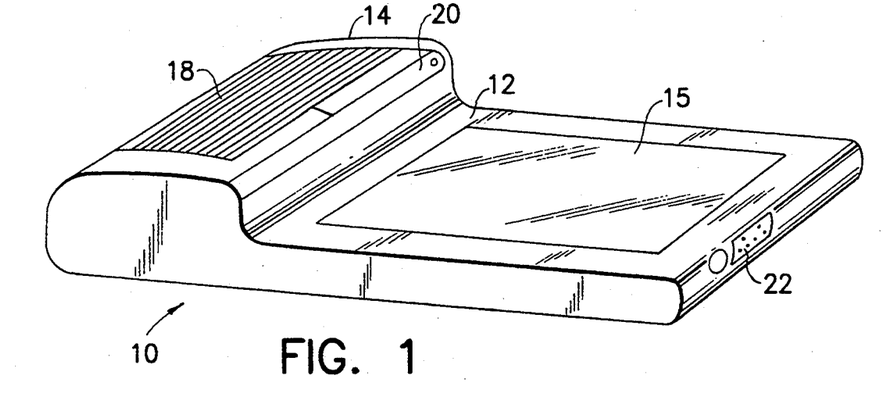
FIG. 1 is a perspective view of a presently preferred embodiment of the folding, portable projector of the invention in a collapsed, transportable state.
Figure 2:
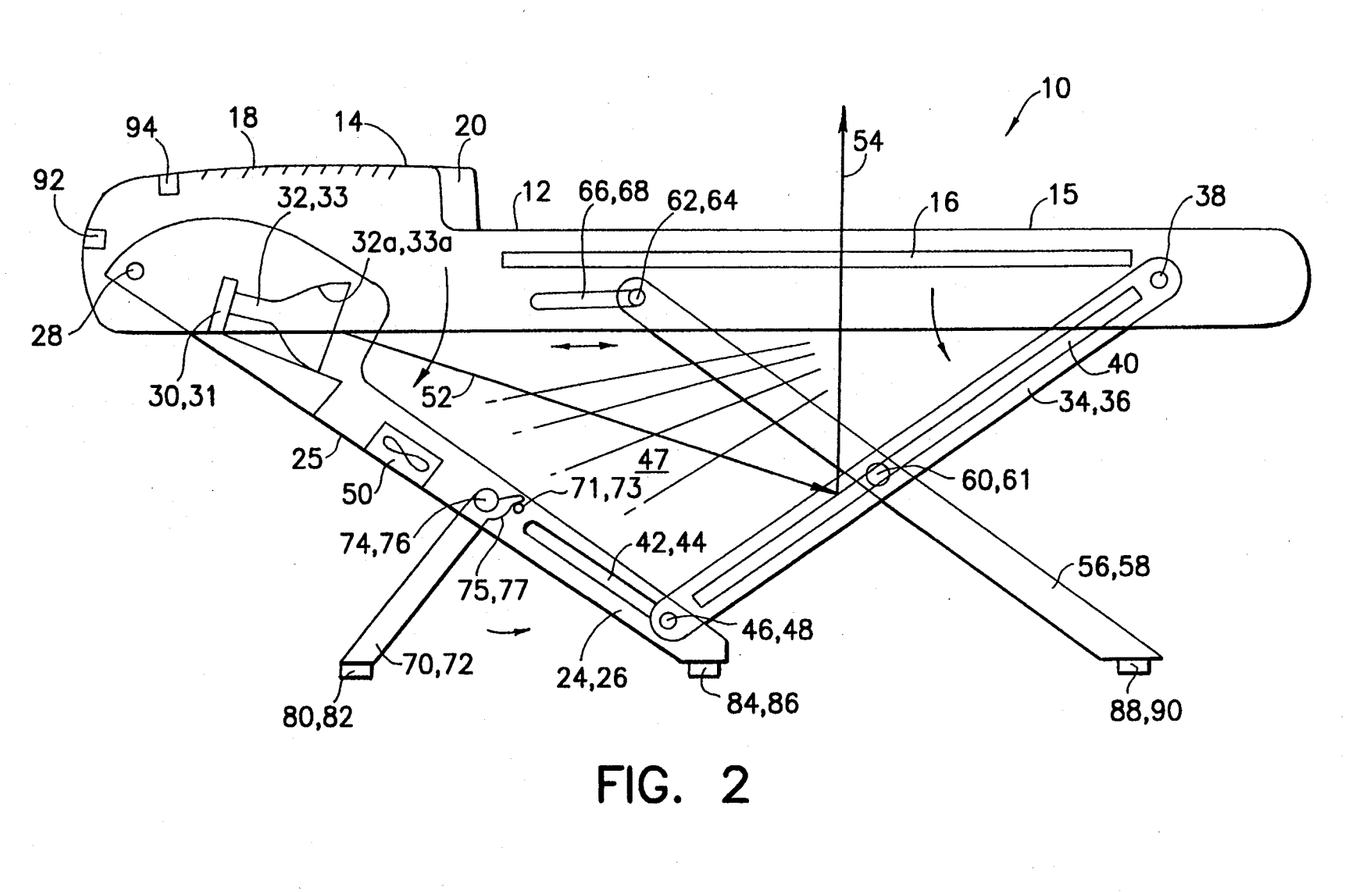
FIG. 2 is a transparent side elevation view of the projector of the invention with the foldable legs extended.
Figure 3:
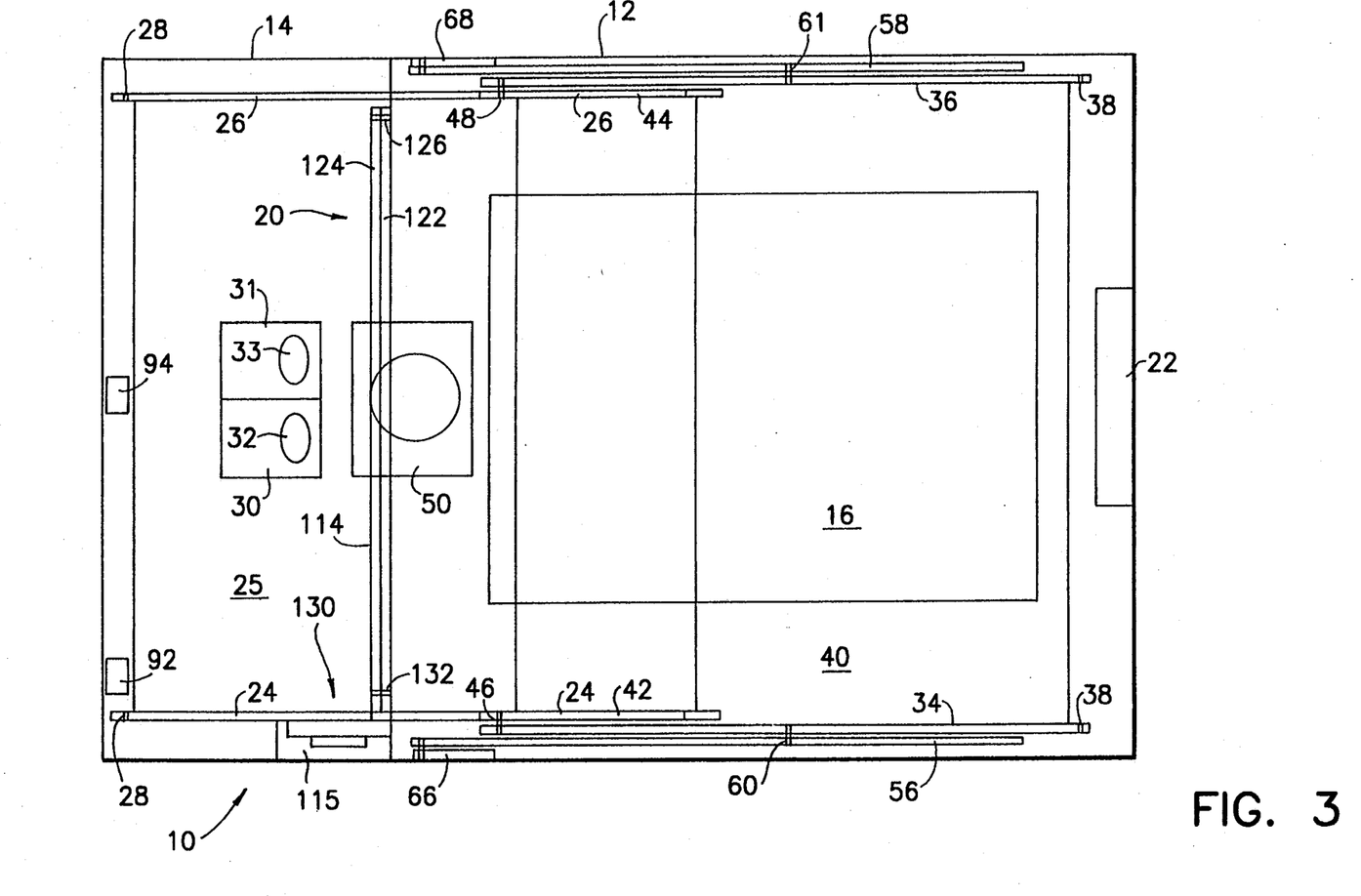
FIG. 3 is a transparent top view of the folding, portable projector of the invention in the collapsed, transportable state.

Referring now to FIGS. 1 through 3, the overhead projector 10 according to the invention includes a stage body 12 and a lamp enclosure 14. The stage body and the lamp enclosure are preferably integral and have overall dimensions of approximately twelve inches by seventeen inches. The stage body is preferably approximately 1.1 inches high and the lamp housing is approximately 2.9 inches high. A fresnel lens 16 is centrally located and mounted beneath a coated polycarbonate plastic sheet 15 on a top surface of the stage body 12 and has an aperture area of approximately eight inches by ten inches. The lamp enclosure 14 is provided with an upper vented lamp access door 18 and an articulated folding projection arm 20. Accessory outlets 22 are preferably provided on a side of the stage body 12 to provide unswitched power for an LCD panel and/or a computer or video source (not shown). While the dimensions given are not critical, it is preferred that the stage and fresnel lens aperture be appropriately dimensioned to accommodate an LCD projection panel, but that the projector be sufficiently small to fit into a brief case or similar carrying case (not shown).

As seen best in FIGS. 2 and 3, a pair of folding lamp legs 24, 26 which form a first support member are pivotally coupled by an axle 28 to the lamp enclosure 14. A pair of lamp sockets 30, 31 carrying respective lamps 32, 33 with integral reflectors 32a, 33a are coupled to the lamp legs 24, 26 so that hinged movement of the lamp legs 24, 26 relative to the lamp enclosure 14 also pivots the lamps 32, 33 from within the enclosure 14 to a position substantially as shown in FIG. 2. A light baffle panel 25 is mounted between the legs 24, 26 to form one wall of a light dispersion prevention enclosure. A pair of mirror legs 34, 36 are pivotally coupled by an axle 38 to the stage body 12 forming a second support member and a mirror 40 is disposed between the legs 34, 36. The mirror legs and mirror form the second wall of a light dispersion prevention enclosure and the enclosure is completed by a collapsible bellows 47 which is coupled to the mirror legs and the stage body 12. The bellows is advantageously formed from a pair of triangular, opaque, air tight, pleat folded elastic sheets which are seen best in FIG. 5. The lamp legs 24, 26 are provided with slots 42, 44 near their ends and the mirror legs 34, 36 are provided with pins 46, 48 at their ends which engage the slots 42, 44. This engagement of the mirror legs and the lamp legs causes the mirror and lamp legs to fold concurrently from the closed position in FIGS. 1 and 3 to the unfolded position in FIG. 2. According to the presently preferred embodiment, a pancake fan 50 is mounted between the lamp legs 24, 26 and forces air upwards toward the stage body 12. Because of convection currents caused by the heat of the bulb 32 (or 33), and because of the vents in the access door 18, the air supplied by the fan 50 passes over the underside of the fresnel lens 16 and around the lamp 32 (33) and out through the vents in the access door 18. This movement of air thereby cools both the fresnel lens 16 and the lamp 32.

As mentioned above, the lamp enclosure 14 is preferably provided with several switches including an interlock switch 92 and a temperature sensing switch 94 which are described in further detail below.

From the foregoing, it will be appreciated that when the lamp legs 24, 26 and the mirror legs 34, 36 are extended to the opened position as shown in FIG. 2, the position of the lamps 32, 33 and the mirror 40 are such that light from the lamp 32 (or 33) is directed onto the mirror 40 along a path shown approximately by the arrow 52 and is reflected by the mirror towards and through the fresnel lens 16 along a path shown approximately by the arrow 54. It will also be appreciated that when the legs are in this position, the light baffle 25, the mirror 40, and the bellows 47 form a light dispersion prevention enclosure between the lamp 32, 33, the mirror 40, and the fresnel lens 16, thereby assuring transmission of light from the lamp 32 (or 33) through the lens 16 without spilling unwanted light into the ambient area.

According to the presently preferred embodiment, a third pair of balancing legs 56, 58 are hingedly coupled to the mirror legs 34, 36 by pins 60, 61 in a scissor-like manner to form a balancing support member. The upper ends of the balancing legs are also hingedly coupled to the stage body 12 by pins 62, 64 in slots 66, 68 as will be described in further detail below. In order to provide even more stable balancing of the projector, a fourth pair of folding legs 70, 72 are hingedly coupled to the lamp legs 24, 26, respectively, by pins 74, 76 as shown in FIG. 2 to form a second balancing support member. These legs 70, 72 are foldable from a position substantially parallel to the lamp legs 24, 26 to a position substantially orthogonal to the lamp legs 24, 26 and are preferably held in the substantially orthogonal position by springs against small surface bumps 71, 73 acting as stops on the legs 24, 26. The legs 70, 72 are held in the closed, folded position by cams 75, 77 which are engaged by mirror legs 34, 36 when they are moved into the folded, closed position.

It is also preferred that each of the aforementioned legs be provided with a non-skid foot 80, 82, 84, 86, 88, 90 which can be a small piece of rubber or the like which is glued onto bent ends of the legs.

Figures 2A, 2B:
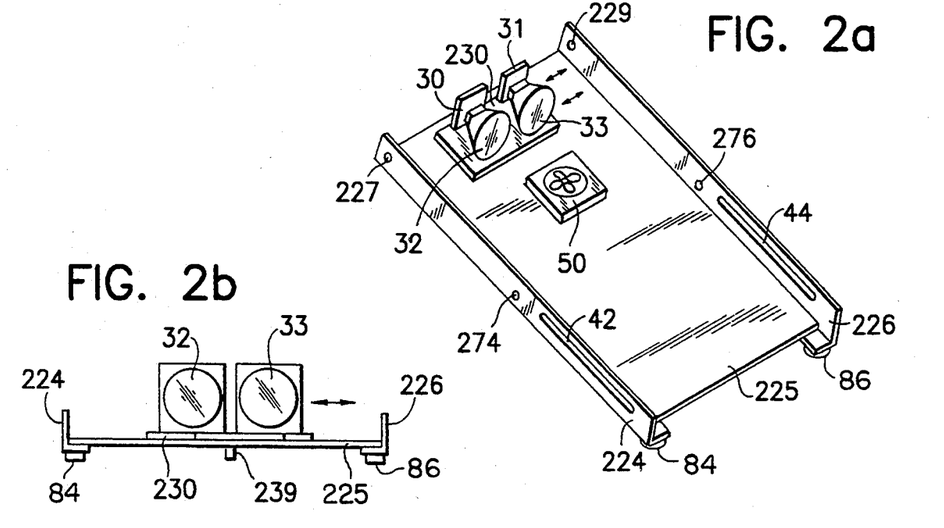

Turning now to FIGS. 2a through 2d, according to the presently preferred embodiment, the first and second supporting members are each formed as single panels. As seen in FIGS. 2a and 2b, the first supporting member is a panel 225 having upstanding portions 224, 226 which are provided with slots 42, 44 and holes 227, 229, 274, and 276. The holes 227, 229 are for engaging the axle 28 described above. The holes 274, 276 are for engaging pins 74, 76 described above. The slots 42, 44 are substantially the same as described above. In this embodiment, the lamp sockets 30, 31 are mounted on a slidable carrier 230 having a lower extending arm 239 for sliding the carrier in the direction shown by the arrows in FIGS. 2a and 2b. Sliding the carrier 230 positions a selected one of the lamps 32, 33 in an operative position.

Figures 2C, 2D:
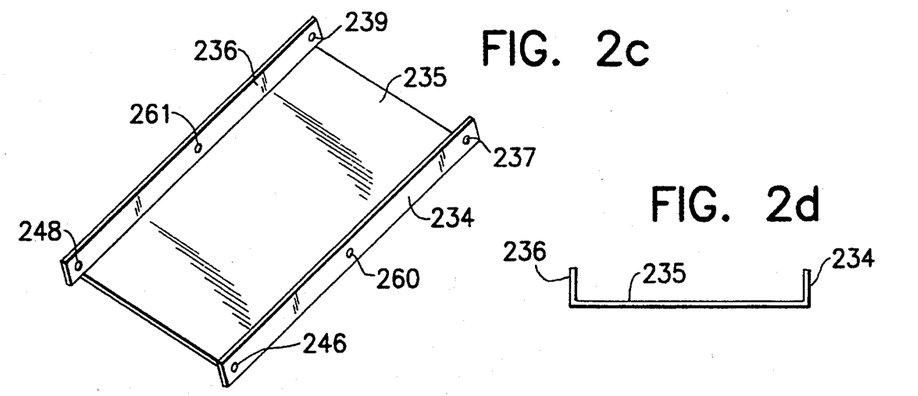
FIG. 2c is a perspective view of a preferred embodiment of the second support member.
FIG. 2d is a side elevation view of the support member of FIG. 2c.

As seen in FIGS. 2c and 2d, the presently preferred embodiment of the second supporting member is a panel 235 having upstanding edges 234, 236 which are provided with holes 237, 239, 260, 261, 246, and 248. The holes 237, 239 are for engaging the axle 38 described above. The holes 246, 248 are for carrying the pins 46, 48 described above, and the holes 260, 261 are for engaging or carrying the pins 60, 61 described above.

Figure 2E:
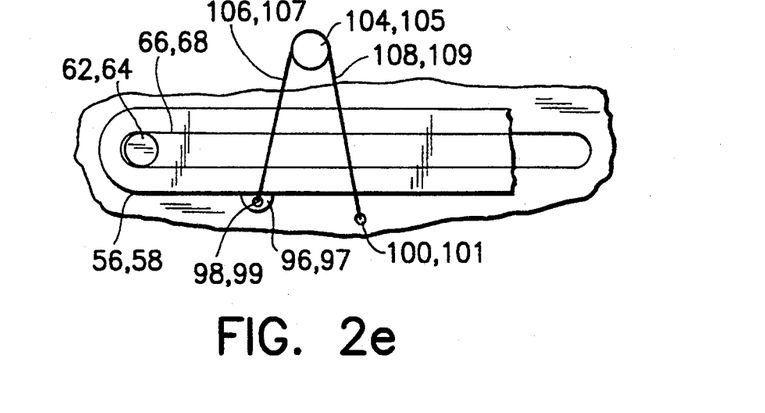
FIGS. 2e and 2f are enlarged transparent views of the torsion spring coupling for foldable legs with the legs in the closed and opened positions respectively.
Figure 2F:
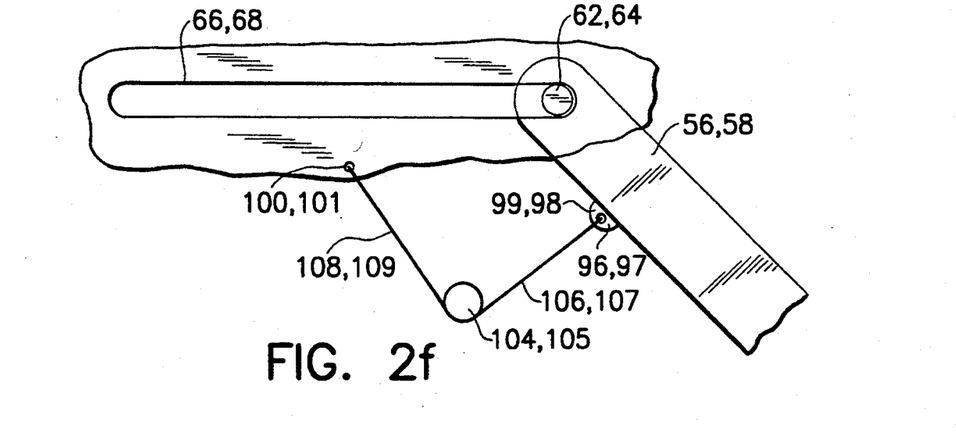

Turning now to FIGS. 2e and 2f, the coupling of the balancing legs 56, 58 to the slots 66, 68 in the stage body is shown in greater detail. Each of the balancing legs 56, 58 is provided with a pin 62, 64 which engages a respective slot 66, 68 and is slidable within the slot from a position approximately shown in FIG. 2e to a position approximately shown in FIG. 2f. It will be appreciated that when the pins 62, 64 are located at one end of the slots 66, 68, the legs 56, 58 are substantially parallel to the slots and are in the "closed position". When the pins 62, 64 are located at the other end of the slots 66, 68, the legs 56, 58 are oblique to the slots and are in the "opened position". According to the presently preferred embodiment of the invention, each of the legs 56, 58 is provided with an ear 96, 97 having a pivot hole 98, 99 which pivotally engages one arm 106, 107 of a torsion spring 104, 105. The other arm 108, 109 of the torsion spring 104, 105 is pivotally engaged by a pivot hole 100, 101 which is centrally adjacent to the slot 66, 68. The arms of the torsion spring are biased apart from each other and thereby bias the ear 96, 97 away from the pivot hole 100, 101. It will therefore be appreciated that when each of the legs 56, 58 is in the closed position shown in FIG. 2a, the respective torsion spring 104, 105 biases the respective ear 96, 97 away from the respective pivot hole 100, 101 and toward one end of the slot 66, 68 holding the respective leg 56, 58 in the closed position. Since the balance legs 56, 58 are coupled to the other legs, as described above, the entire folding leg assembly is thus biased to the closed position. When the leg assembly is unfolded to the opened position, the ears 96, 97 are moved toward the pivot holes 100, 101 and the biased arms 106, 107 and 108, 109 pivot in their respective holes 98, 99 and 100, 101 so that the springs 104, 105 assume a position such as shown in FIG. 2b. In this opened position, the respective torsion springs 104, 105 bias the respective ears 96, 97 away from the respective pivot holes 100, 101 and toward the other end of the respective slots 66, 68, thereby holding and biasing the respective legs 56, 58 in the opened position.

Figure 4:
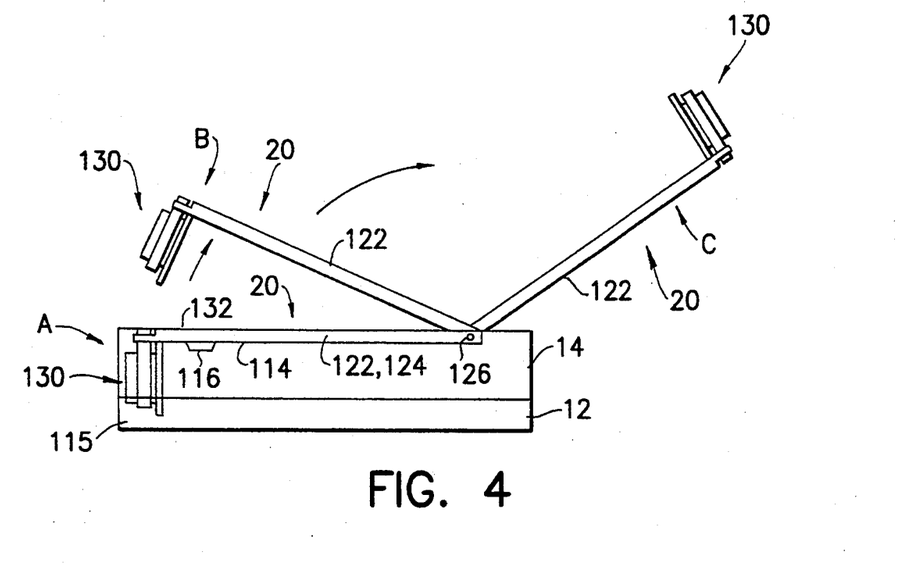
FIG. 4 is a partially transparent side elevation end view of the invention showing the upper portion of the projection arm in a folded position, a partially raised position, and a fully raised position.

A first embodiment of the articulated folding projection arm 20 is shown in FIGS. 3, 4, 4a, and 4b. The projection arm includes an upper arm portion 122 and a lower arm portion 124 which are coupled to each other by a pivot 126 which is described in further detail below with reference to FIGS. 4c and 4d. The upper arm portion 122 carries a lens and mirror assembly 130 which is described in detail below. The lower arm portion 124 is pivotally coupled to the lamp enclosure 14 by a locking pivot 132. FIG. 4 shows the projection arm 20 in the folded state "A", and in two stages "B" and "C" of deployment. In the folded state "A", which is also shown in FIG. 3, the upper and lower arm portions 122, 124 lie side by side in a shelf 114 of the lamp enclosure 14 and the lens and mirror assembly 130 resides in a side pocket 115 in the lamp enclosure 14. The shelf 114 is preferably provided with a recess 116 near the side pocket 115 so that the upper arm portion 122 may be lifted by inserting a finger under the upper arm portion 122 through the recess 116. When the upper arm portion 122 is so lifted, it pivots up relative to the lower arm portion 124 and the lamp enclosure 14 to the positions "B" and "C" shown in FIG. 4. The pivot 126 locks and holds the upper arm portion 122 when it has been lifted to the position "C" which is at an angle of approximately 75 degrees relative to the lower arm portion 124. Those skilled in the art will appreciate that it is advantageous that the pivot 126 also hold the upper and lower arms in the position "A" so that the arms do not unfold unintentionally when the projector is being transported. The locking action of the pivot 126 is shown and described in detail below with reference to FIGS. 4c and 4d.

Figure 4A:
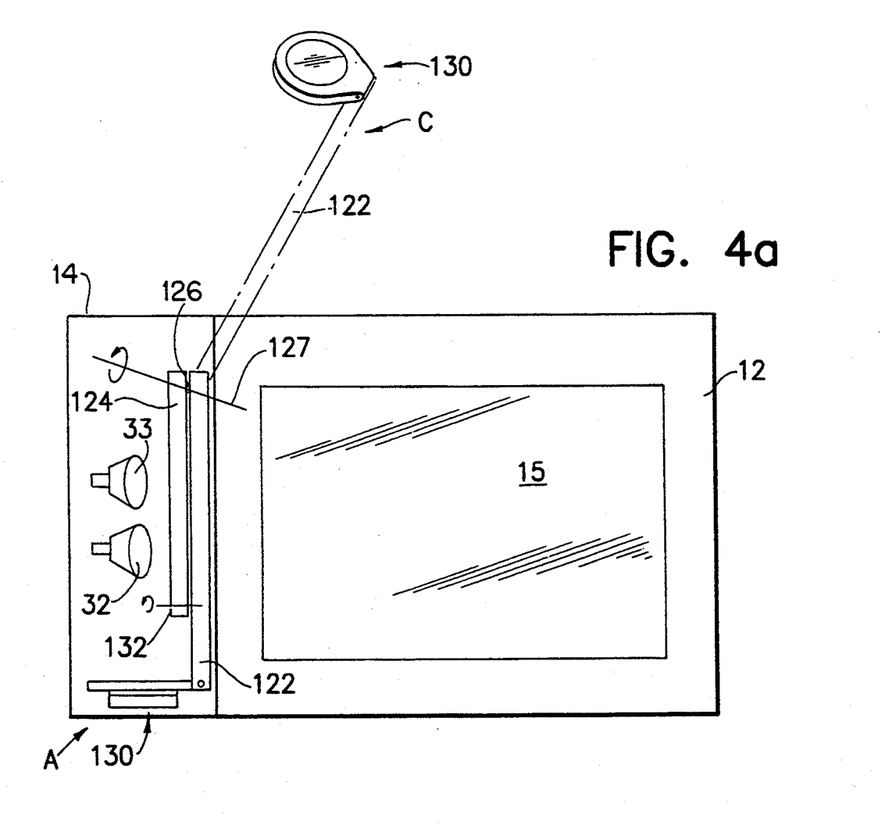
FIG. 4a is a top view of the invention showing the upper portion of the projection arm in a folded position and in a fully raised position.

Turning now to FIG. 4a, it will be seen that the axis 127 of the pivot 126 is oblique to the arms 122, 124 so that when the upper arm portion 122 has been lifted to the position "C" it is angled relative to the vertical and towards the stage 12. When the upper arm 122 is locked relative to the lower arm 124, the lower arm portion 124 is lifted up from the shelf 114 to an angle of approximately 75 degrees relative to the shelf 114 as shown in position "D" in FIG. 4b. When the arms 122, 124 are in this position, the lower arm 124 is locked in position relative to the lamp enclosure 14 by a button 134 in the side of the lamp enclosure 14 below the shelf 114. The button 134 and its operation are shown and described below with reference to FIGS. 4e through 4g.

Figure 4B:
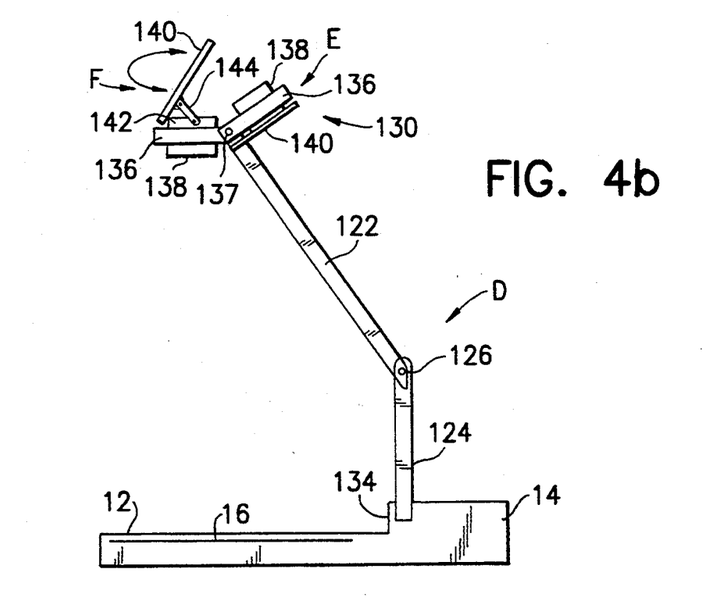
FIG. 4b is a side elevation view of the invention showing the upper and lower portions projection arm in the fully raised position with the mirror and lens rotated into the operational position.

When the arms 122, 124 are in the position "D" shown in FIG. 4b, the lens and mirror assembly is centrally located over the stage 12. The lens and mirror assembly 130 is then folded open from the position "E" to the position "F" shown in FIG. 4b. As seen in FIG. 4b, the lens and mirror assembly 130 includes a lens frame 136 which carries a focusable lens 138 and a folding mirror 140. The lens frame 136 is hinged to the upper arm 122 by a pivot 137 having stops to hold the lens frame in either position "E" or position "F". The mirror 140 is hinged to a rotatable ring 142 by a hinge 144 so that the angle of the mirror 140 is adjustable relative to the lens frame 136 and the mirror 140 is also rotatable about the axis of lens 138. Those skilled in the art will appreciate that the mirror 140 is tilted and rotated to point towards a projection screen or large flat surface upon which images will be projected. The image projected by the projector is focused by rotating a focusing ring 139 on the lens 138. Those skilled in the art will appreciate that the focusing ring 139 moves internal lens elements (not shown) in the lens 138 so as to change the focal plane of the lens.

Figure 4C:
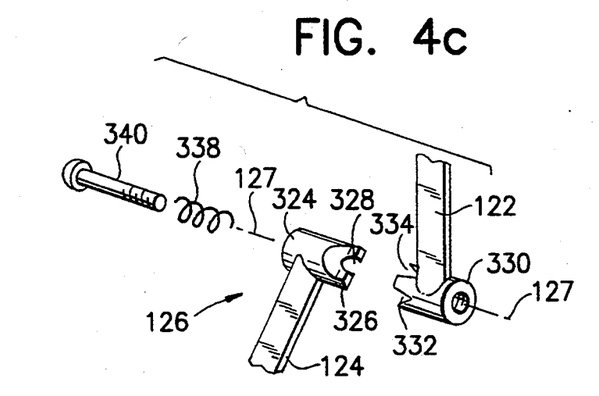
FIG. 4c is a broken exploded view of the pivot joint between the upper and lower arm portions.
Figure 4D:
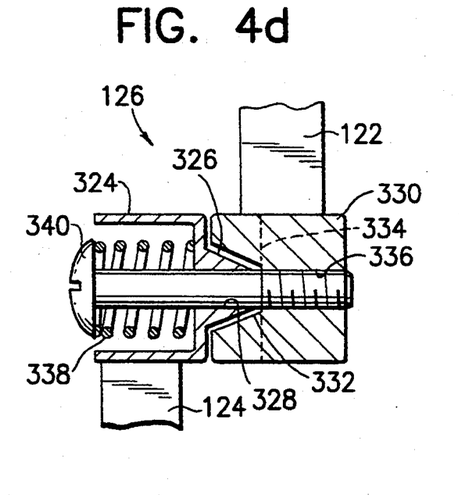
FIG. 4d is a broken cross sectional view of the assembled pivot joint.

Turning now to FIGS. 4c and 4d, the pivot joint 126 between the upper arm 122 and the lower arm 124 is shown as a spring biased cam and slot arrangement. In the embodiment shown in FIGS. 4c and 4d, the upper end of the lower arm 124 is provided with a cam cylinder 324 which has an axis 127 oblique to the axis of the arm 124 as described above. One end of the cylinder 324 has an axially cammed surface 326, and a through bore 328 extends through the cylinder 324. The lower end of the upper arm 122 is provided with a slotted cylinder 330 having the same axis 127 relative to the upper arm 122 when the arms are in the folded position as described above. One end of the cylinder 330 is provided with a pair of diametrical slots 332, 334 for receiving the cammed surface 326 of cylinder 324 as seen best in FIG. 4d. It will be appreciated that the angle between the slots 332, 334 is approximately equal to the angle of the upper arm when it is in position "C" as seen best in FIG. 4. The cylinder 330 is also provided with a threaded through bore 336. The pivot joint 126 is assembled by inserting a screw 340 through a compression spring 338 and the through bore 328 of the cam cylinder 324 and threading the screw 340 into the threaded through bore 336 of the slot cylinder 330 as shown in FIG. 4d. Those skilled in the art will appreciate that in this arrangement, the spring 338 biases the cammed surface 326 into the slots 332, 334 thereby "locking" the arms in either the raised or folded position. It will further be appreciated that the slots and the cam have sloped edges so that exerting a twisting force against the joint will raise the cam out of the slot so that the arms can be raised or folded.

Figure 4E:
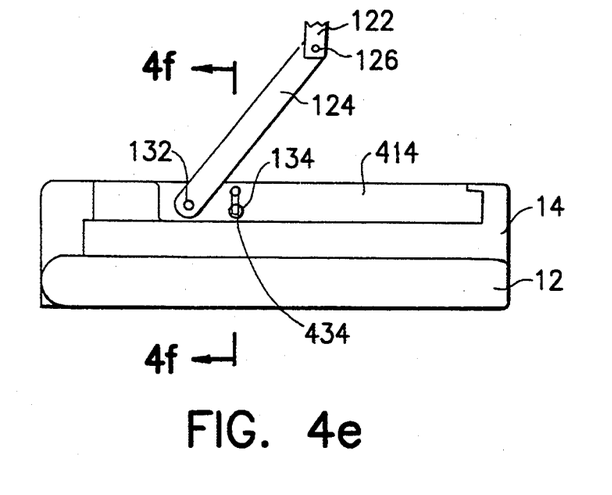
FIG. 4e is a broken side elevation view showing the location of the projection arm release button.
Figure 4F:
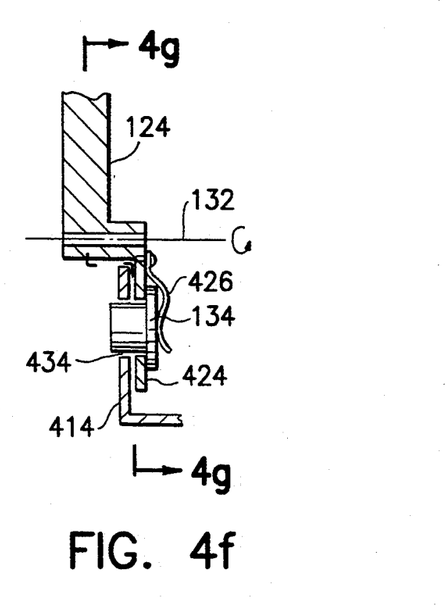
FIG. 4f is a broken cross sectional view along the line 4f—4f in FIG. 4e.
Figure 4G:
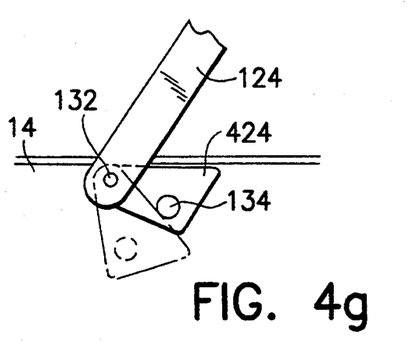
FIG. 4g is a broken cross sectional view along the line 4g—4g in FIG. 4f.

Turning now to FIGS. 4e through 4g, the lower arm 124 is lockable in and releasable from a raised position by the action of a button 134. The button 134 is carried on an ear 424 which extends obliquely from the lower arm 124 at its pivot axis 132 and substantially orthogonal to the pivot axis 132. The button 134 is biased perpendicularly out from the ear 424 by a spring 426. When the lower arm 124 is in the raised position as shown in FIG. 4e, the button 134 is biased by the spring 426 into a hole 434 in the wall 414 of the lamp enclosure 14 and prevents further movement of the lower arm 124 about the axis 132. Those skilled in the art will appreciate that the pressing of the button 134 releases the lower arm 124 for folding back to the storage position.

Figure 5:
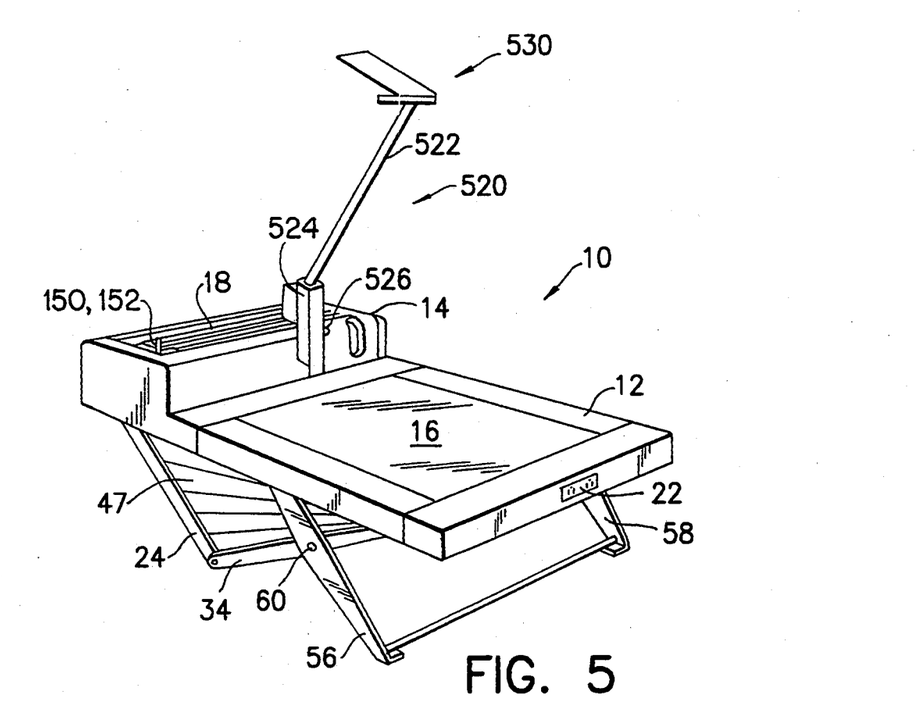
FIG. 5 is a perspective view of the folding, portable projector of the invention in an operational state with an alternate embodiment of the projection arm.
Figure 6:
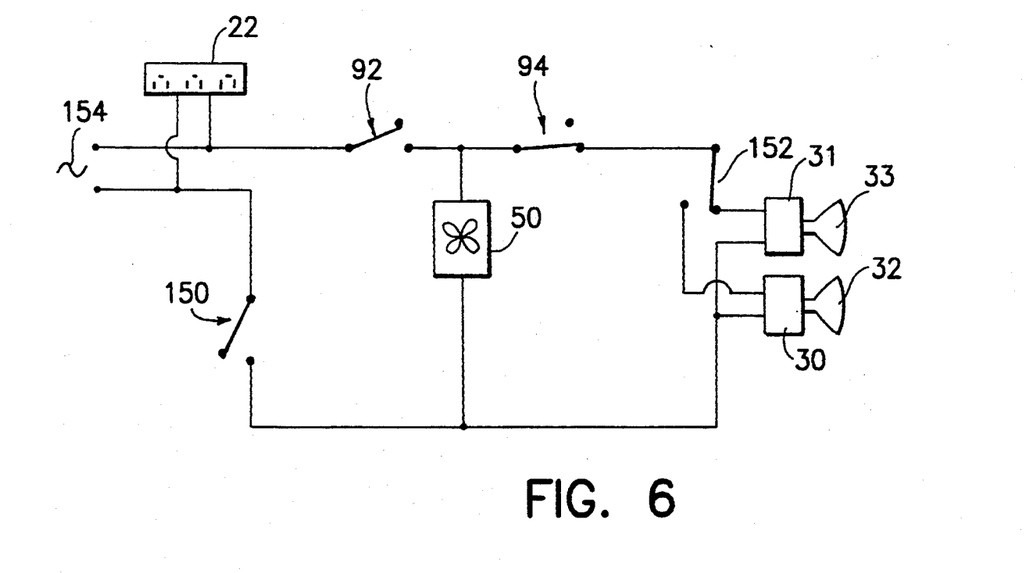
FIG. 6 is a schematic diagram of one embodiment of electrical connections in the projector.

FIG. 5 shows a perspective view of the projector 10 in its operational state. It will be appreciated that the folding legs operate independently of the projection arm and that after the projector 10 is erected to this state, the lamp(s) and cooling fan may be activated by a switch 150. A schematic diagram of one possible wiring scheme is shown in FIG. 6. According to the wiring scheme of FIG. 6, a source of AC voltage 154, once coupled to the projector, is constantly supplied to auxiliary outlets 22 as mentioned above. The folding leg interlock switch 92 supplies power to the cooling fan 50 and the lamps 32, 33 only when the legs are extended to the fully open position shown in FIGS. 2 and 5. The temperature sensitive switch 94 is normally closed and disconnects power from the lamps 32, 33 only when the temperature in the lamp enclosure 14 rises to a dangerous level. It should be noted that the switch 94 does not remove power from the cooling fan 50. A lamp selector switch 152 is coupled to the two lamp sockets 30, 31 so that either lamp 32 or lamp 33 may be selected for illumination. It will be appreciated that this dual lamp design allows a presentation to continue with the flick of the switch 152 if the lamp in use should fail. The main power ON switch 150 supplies both the fan 50 and the lamps 32, 33, but does not affect the outlets 22. It will be appreciated that the outlets 22 are provided for an LCD panel, portable computer, or video source and that it is often desirable to power down the projector without also powering down these other devices.

FIG. 5 also shows an alternate embodiment of the projection arm 520. In this embodiment, the lens and mirror assembly 530 holds a fixed focal length lens and the upper arm 522 is coupled to the lower arm 524 with a rack and pinion type focusing device operable by a knob 526. By twisting the knob 526, the upper arm 522 is moved vertically relative to the lower arm 524 and the lens and mirror assembly 530 is thereby moved vertically relative to the stage 12. Alternatively, rather than a rack and pinion arrangement, telescoping tubes can be utilized in conjunction with the fixing knob 526.

There have been described and illustrated herein several embodiments of a foldable portable overhead projector. While particular embodiments of the invention have been described, it is not intended that the invention be limited thereto, as it is intended that the invention be as broad in scope as the art will allow and that the specification be read likewise. Thus, while a distinction has been made between the lamp enclosure and the stage body, these elements may be integral or separate without departing from the spirit of the invention. In addition, while particular dimensions have been disclosed by way of example, it will be appreciated that other dimensions could be utilized. Also, while the stage body has been disclosed as having a fresnel lens on its top surface, it will be understood that the equivalent of a fresnel lens may be used and that the lens may be located below the top surface so long as there is a light path from the mirror through the lens and through the top surface of the stage body. It will also be understood that the number and specific location of the lamps, vents, switches, outlets, axles, etc. may be varied from that shown herein without compromising the basic functions of the invention. For example, the lamp access door may also be provided with a safety switch which shuts off the lamp(s) when the door is opened. Moreover, while the lamps and the mirror have been described as coupled to their respective legs, it will be appreciated that they could be hingedly mounted apart from the legs but cooperate with the legs to assume the proper positions in the collapsed and erected states. It will also be understood that with certain lamps having separate reflectors, it may not be necessary to pivot the lamp at all, but only to pivot the lamp reflector so that light from the lamp is directed toward the mirror when the legs are folded open. Furthermore, while the legs have been disclosed as having torsion spring arrangement for biasing the legs in the opened and closed positions, it will be understood that different types of biasing members can achieve the same or similar function as disclosed herein. It will therefore be appreciated by those skilled in the art that yet other modifications could be made to the provided invention without deviating from its spirit and scope as so claimed.

I claim:

1. A folding, portable overhead projector comprising:
   a) a stage body having a top surface which has a light transmissive portion;
   b) a lamp enclosure, said lamp enclosure being formed contiguous to one side of said stage body;
   c) a first support member hingedly coupled to one of said lamp enclosure and said stage body and being movable from a first position, where said first support member is substantially parallel to said top surface, to a second position, where said first support member extends downward from said one of said lamp enclosure and said stage body;
   d) a lamp and a lamp reflector mounted in said lamp enclosure and said lamp reflector pivoting relative to said stage body so that said lamp is substantially contained in said lamp enclosure when said first support member is in said first position and said lamp reflector is directed downward from said lamp enclosure when said first support member is in said second position;
   e) a second support member hingedly coupled to said stage body and movable from a first position, where said second support member is substantially parallel to said top surface, to a second position, where said second support member extends downward from said stage body;
   f) a mirror mounted between said second support member and said stage body and pivoting relative to said stage body so that said mirror is substantially parallel to said stage body when said second support member is in said first position and said mirror is angled downward from said stage body when said second support member is in said second position, said mirror and said lamp reflector assuming positions when said second support member and said first support member are in said second positions such that light from said lamp is reflected by said mirror through said light transmissive portion of said top surface;
   g) a foldable projection arm having a first end coupled to one of said stage body and said lamp enclosure and having a second end positionable over said stage body; and
   h) reflection means mounted on said second end of said foldable projection arm for reflecting light passing through said light transmissive portion of said top surface.

2. An overhead projector according to claim 1, wherein:
   said stage body and said lamp enclosure are substantially rectangular and said lamp enclosure is relatively taller than said stage body.

3. An overhead projector according to claim 1, wherein:
   said first support member comprises a first pair of legs with said lamp mounted between the legs of said first pair of legs; and
   said second support member comprises a second pair of legs with said mirror mounted between the legs of said second pair of legs.

4. An overhead projector according to claim 1, wherein:
   said lamp reflector is coupled to said first support member and said mirror is coupled to said second support member.

5. An overhead projector according to claim 1, further comprising:
   i) first lens means disposed in said stage body for focusing light passing through said light transmissive portion of said top surface; and
   j) second lens means coupled to said reflection means for focusing light reflected by said reflection means.

6. An overhead projector according to claim 3, further comprising:
   i) first light baffle means coupled to said first pair of legs for substantially blocking passage light between said first pair of legs; and
   j) second light baffle means coupled to said stage body and one of said first pair of legs and said second pair of legs for forming an enclosure with said first baffle means between said first pair of legs, said second pair of legs, said lamp enclosure, and said stage body.

7. An overhead projector according to claim 3, further comprising:
   i) at least one vent opening in said lamp enclosure; and
   j) a cooling fan mounted between said the legs of said first pair of legs and directing air toward said stage body.

8. An overhead projector according to claim 1, further comprising:
   i) balancing support member hingedly coupled to said stage body and movable from a first position, where said balancing support member is substantially parallel to said top surface, to a second position, where said balancing legs extend downward from said stage body.

9. An overhead projector according to claim 8, wherein:
   said first support member, said second support member, and said balancing support member are coupled to each other such that all of said support members move concurrently from said first positions to said second positions.

10. An overhead projector according to claim 9, further comprising:
j) support member biasing means coupled to one of said support members for biasing said support members in said first position and said second position.

11. An overhead projector according to claim 10, wherein:
said support member biasing means comprises a torsion spring coupled to said balancing support member and said stage body.

12. An overhead projector according to claim 11, further comprising:
k) a second balancing support member hingedly coupled to said first support member and movable from a first position which is substantially parallel to said first support member to a second position which is oblique to said first support member.

13. An overhead projector according to claim 1, wherein:
said lamp enclosure and said stage body are integral with each other.

14. An overhead projector according to claim 1, wherein:
said lamp is coupled to said first support member.

15. An overhead projector according to claim 1, wherein:
said mirror is coupled to said second support member.

16. An overhead projector according to claim 1, wherein:
said first end of said foldable projection arm is hingedly coupled to said lamp enclosure and said lamp enclosure includes a top recess for receiving said foldable projection arm and said reflection means.

17. An overhead projector according to claim 16, wherein:
said arm has an articulating joint between said first end and said second end, said articulating joint defines an upper arm portion and a lower arm portion, said upper arm portion and said lower arm portion lying substantially parallel to each other when said foldable projection arm is received in said top recess.

18. An overhead projector according to claim 17, wherein:
said reflection means comprises a hinged mirror.

19. An overhead projector according to claim 5, wherein:
said first lens means comprises a fresnel lens and said second lens means comprises a lens having an adjustable focal plane.

20. An overhead projector according to claim 6, wherein:
said second light baffle means comprises a bellows.

21. An overhead projector according to claim 7, further comprising:
k) first switch means coupled to said fan and said lamp for manually turning said lamp and said fan on and off;
l) interlock switch means coupled to said fan and said lamp for automatically turning said lamp and said fan off when said first pair of legs are in said first position; and
m) temperature sensitive switch means coupled to said lamp for automatically turning said lamp off when said temperature sensitive switch means senses a selected temperature.

22. An overhead projector according to claim 21, further comprising:
n) a second lamp mounted between the legs of said first pair of legs; and
o) second switch means coupled to said lamp and said second lamp for selecting one of said lamp and said second lamp to be illuminated.

23. An overhead projector according to claim 8, wherein:
said balancing support member is hingedly coupled to said second support member in a scissor-like manner;
said second support member is hingedly coupled to said first support member by a first pin and slot coupling; and
said balancing support member is hingedly coupled to said stage body by a second pin and slot coupling.

24. A folding, portable overhead projector comprising:
a) a stage body having a top surface which has a light transmissive portion;
b) a lamp enclosure, said lamp enclosure being formed contiguous to one side of said stage body;
c) a first support member hingedly coupled to one of said lamp enclosure and said stage body and being movable from a first position, where said first support member is substantially parallel to said top surface, to a second position, where said first support member extends downward from said one of said lamp enclosure and said stage body;
d) a lamp mounted in said lamp enclosure and directed downward from said lamp enclosure;
e) a second support member hingedly coupled to said stage body and movable from a first position, where said second support member is substantially parallel to said top surface, to a second position, where said second support member extends downward from and substantially external of said stage body;
f) a mirror mounted between said second support member and said stage body and pivoting relative to said stage body so that said mirror is substantially parallel to said stage body when said second support member is in said first position and said mirror is angled downward from and substantially external of said stage body when said second support member is in said second position, said mirror assuming a position when said second support member is in said second positions such that light from said lamp is reflected by said mirror through said light transmissive portion of said top surface;
g) a foldable projection arm having a first end coupled to one of said stage body and said lamp enclosure and having a second end positionable over said stage body; and
h) reflection means mounted on said second end of said foldable projection arm for reflecting light passing through said light transmissive portion of said top surface.

25. A folding, portable overhead projector comprising:
a) a stage body having a top surface which has a light transmissive portion;

b) a lamp enclosure, said lamp enclosure being formed contiguous to one side of said stage body;

c) a first support member hingedly coupled to one of said lamp enclosure and said stage body and being movable from a first position, where said first support member is substantially parallel to said top surface, to a second position, where said first support member extends downward from said one of said lamp enclosure and said stage body;

d) a lamp mounted in said lamp enclosure and pivoting relative to said stage body so that said lamp is directed downward from said lamp enclosure when said first support member is in said second position;

e) a second support member hingedly coupled to said stage body and movable from a first position, where said second support member is substantially parallel to said top surface, to a second position, where said second support member extends downward from said stage body;

f) a mirror mounted between said second support member and said stage body, said lamp assuming a position relative to said mirror when said first support member is in said second position such that light from said lamp is reflected by said mirror through said light transmissive portion of said top surface;

g) a foldable projection arm having a first end coupled to one of said stage body and said lamp enclosure and having a second end positionable over said stage body; and h) reflection means mounted on said second end of said foldable projection arm for reflecting light passing through said light transmissive portion of said top surface.

* * * * *